(12) United States Patent
Fischer

(10) Patent No.: US 10,100,906 B2
(45) Date of Patent: Oct. 16, 2018

(54) SPINDLE DRIVE FOR AN ADJUSTMENT ELEMENT OF A MOTOR VEHICLE

(71) Applicant: Brose Fahrzeugteile GmbH & Co. KG, Hallstadt, Hallstadt (DE)

(72) Inventor: Uwe Fischer, Sonneberg (DE)

(73) Assignee: Brose Fahrzeugteile GmbH & Co. KG, Hallstadt, Hallstadt (DE)

( * ) Notice: Subject to any disclaimer, the term of this patent is extended or adjusted under 35 U.S.C. 154(b) by 0 days.

(21) Appl. No.: 14/368,189

(22) PCT Filed: Dec. 5, 2012

(86) PCT No.: PCT/EP2012/005011
§ 371 (c)(1),
(2) Date: Jun. 23, 2014

(87) PCT Pub. No.: WO2013/091779
PCT Pub. Date: Jun. 27, 2013

(65) Prior Publication Data
US 2014/0366662 A1   Dec. 18, 2014

(30) Foreign Application Priority Data
Dec. 23, 2011   (DE) .......... 10 2011 122 316

(51) Int. Cl.
*F16H 25/20* (2006.01)
*E05F 15/622* (2015.01)

(52) U.S. Cl.
CPC ............ *F16H 25/20* (2013.01); *E05F 15/622* (2015.01); *E05Y 2900/546* (2013.01);
(Continued)

(58) Field of Classification Search
CPC .. F16H 25/20; F16H 25/24; F16H 2025/2059; F16H 25/2056;
(Continued)

(56) References Cited

U.S. PATENT DOCUMENTS

| 3,751,998 A | 8/1973 | Vasilatos et al. |
| 4,560,894 A | 12/1985 | Stoll et al. |

(Continued)

FOREIGN PATENT DOCUMENTS

| CN | 101922540 | 12/2010 |
| CN | 101967930 | 2/2011 |

(Continued)

OTHER PUBLICATIONS

International Search Report and Written Opinion for PCT/EP2012/005011, dated Jan. 3, 2014 (English Translation from WIPO) (11 pages).

(Continued)

*Primary Examiner* — Victor L MacArthur
(74) *Attorney, Agent, or Firm* — Pauly, DeVries Smith & Deffner LLC

(57) ABSTRACT

The invention relates to a spindle drive for an adjusting element of a vehicle comprising a drive motor with a spindle-spindle nut gear arranged downstream for producing a drive force along a geometric spindle axis, wherein two connectors for transferring the drive force are provided, wherein an internal housing connected to the one connector and an external housing connected to the other connector are provided, and wherein during the motorized adjustment, the internal housing runs in a telescopic manner. It is proposed that at least one of the two housings, is designed to be at least in two parts and is provided via a first axial housing portion of a first housing part made of a first material and via a second axial housing portion of a second housing part made of a second material.

18 Claims, 3 Drawing Sheets

(52) U.S. Cl.
CPC .............. *F16H 2025/2031* (2013.01); *F16H 2025/2075* (2013.01); *Y10T 29/49464* (2015.01); *Y10T 74/18576* (2015.01)

(58) Field of Classification Search
CPC .......... E05Y 2400/812; E05Y 2900/50; E05Y 2900/546; E05F 15/622
See application file for complete search history.

(56) References Cited

U.S. PATENT DOCUMENTS

| | | | |
|---|---|---|---|
| 5,041,748 A | 8/1991 | Huber et al. | |
| 6,516,567 B1 * | 2/2003 | Stone | E05F 15/622 296/55 |
| 7,665,794 B2 | 2/2010 | Kachouh | |
| 8,156,838 B2 | 4/2012 | Batosky et al. | |
| 9,097,056 B2 | 8/2015 | Kummer et al. | |
| 9,103,373 B1 * | 8/2015 | Kolar | F16C 35/073 |
| 9,260,899 B2 * | 2/2016 | Loeffler | E05F 1/1041 |
| 9,689,188 B2 | 6/2017 | Fischer et al. | |
| 2007/0062119 A1 * | 3/2007 | Ritter | E05F 15/622 49/343 |
| 2008/0216409 A1 | 9/2008 | Bochen et al. | |
| 2010/0186528 A1 | 7/2010 | Hillen et al. | |
| 2010/0192715 A1 * | 8/2010 | Vauchel | F02K 1/763 74/89.35 |
| 2010/0230907 A1 | 9/2010 | Hatano et al. | |
| 2011/0271793 A1 | 11/2011 | Hatano | |
| 2011/0290050 A1 | 12/2011 | Kummer et al. | |
| 2013/0024076 A1 * | 1/2013 | Fukui | E05F 15/622 701/49 |
| 2015/0240547 A1 | 8/2015 | Fischer et al. | |
| 2017/0268276 A1 | 9/2017 | Fischer et al. | |

FOREIGN PATENT DOCUMENTS

| | | | | |
|---|---|---|---|---|
| DE | 8428487 | | 12/1985 | |
| DE | 202005000559 | | 1/2006 | |
| DE | 102004040170 | | 3/2006 | |
| DE | 202006006792 | | 7/2006 | |
| DE | 202005003466 | | 8/2006 | |
| DE | 102005030052 | | 12/2006 | |
| DE | 202007002306 | | 7/2008 | |
| DE | 102008061118 | * | 10/2008 | ............. E05F 15/12 |
| DE | 102008061118 | | 6/2010 | |
| DE | 102008061120 | | 6/2010 | |
| DE | 102008062391 | | 6/2010 | |
| DE | 102008062400 | | 6/2010 | |
| DE | 102011122316 | | 6/2013 | |
| EP | 2284345 | | 2/2011 | |
| JP | 2007331699 | | 12/2007 | |
| JP | 2009247109 | | 10/2009 | |
| WO | 2013091779 | | 6/2013 | |

OTHER PUBLICATIONS

Search Report for German Patent Application No. 102011122316.2, dated Jan. 26, 2012 (4 pages).
International Search Report for PCT/EP2013/068018, dated May 2, 2014 (6 pages).
Search Report for German Patent Application No. 102012018826.9, dated Nov. 27, 2013 (5 pages).
Non-Final Office Action for U.S. Appl. No. 14/431,059 dated Jul. 5, 2016 (15 pages).
Notice of Allowance for U.S. Appl. No. 14/431,059 dated Mar. 1, 2017 (23 pages).
Office Action for Korean Patent Application No. 10-2015-7010717, dated Jul. 14, 2016 (4 pages), English translation.
First Office Action for Chinese Patent Application No. 2012800704808, related co-pending U.S. Appl. No. 14/368,189, dated Mar. 24, 2016 (7 pages), English translation only.
Search Report for Chinese Patent Application No. 201380049969.1, dated Jan. 23, 2017 (1 page).

* cited by examiner

SPINDLE DRIVE FOR AN ADJUSTMENT ELEMENT OF A MOTOR VEHICLE

CROSS-REFERENCE TO RELATED APPLICATIONS

This application is a national stage application under 35 U.S.C. 371 of International Patent Application Ser. No. PCT/EP2012/005011, entitled "Spindelantrieb für ein Verstellelement eines Kraftfahrzeugs," filed Dec. 5, 2012, which claims priority from German Patent Application No. DE 10 2011 122 316.2, filed Dec. 23, 2011, the disclosures of which are incorporated herein by reference.

FIELD OF THE INVENTION

The present invention relates to a spindle drive for an adjusting element of a motor vehicle.

BACKGROUND

The term "adjusting element" in the present case is to be understood in broad terms. It encompasses, for example, a tailgate, a trunk lid, an engine hood, a side door, a luggage compartment flap, a lifting roof, or the like of a motor vehicle. The field of application of the motorized adjustment of a tailgate of a motor vehicle is given precedence hereinafter. This is not to be understood as limiting.

During the motorized actuation of tailgates, or the like, the use of spindle drives is becoming increasingly important. The known spindle drive (DE 10 2008 062 391 A1), on which the invention is based, is provided with a drive motor with a spindle-spindle nut gear arranged downstream for producing a drive force along a geometric spindle axis, wherein the drive force is transferred via two connectors on the end face. The spindle drive has an internal housing receiving the drive motor and an external housing which run inside one another in a telescopic manner during the motorized adjustment. In this case, at least one part of the internal housing or the external housing is designed from a plastics material in order to ensure a reduction in weight and to enable latching connections to be produced in a simple manner.

A further known spindle drive (DE 20 2005 000 559 U1) also reveals the use of plastics materials for the housing of the spindle drive. By the use of plastics materials, it is necessary in this case to produce the internal housing or the external housing, for example, from half-shells made of plastics material.

The aforementioned use of plastics materials when producing the internal housing and/or the external housing of spindle drives not only provides advantages with regard to weight and construction but also with regard to the resulting costs. Optimally, however, with regard to the structural design of the spindle drive, the mechanical properties thereof should not be inferior to a spindle drive with a metal housing, in particular with regard to the resulting rigidity.

SUMMARY

The object of the invention is to design and develop the known spindle drive such that the mechanical properties thereof are improved.

Essentially, the principal consideration of the invention is to design at least one of the two housings, in particular the internal housing, at least in two parts. The two-part design with two housing parts results in a first axial housing portion made of a first material and a second axial housing portion made of a second material.

According to the proposed solution, the arrangement is such that the first axial housing portion is always located outside the flux of force for the drive force. This permits a design of the first axial portion in a particularly cost-effective manner, for example from a plastics material.

The proposed solution, namely in particular to produce the internal housing in axial housing portions made of different materials, permits a design of the housing of the spindle drive which is adapted to the actual force ratios. By the targeted use of appropriate materials, the mechanical properties may be improved at low cost.

An embodiment takes account of the fact that the principal flux of force passes via the second axial housing portion of the two-part housing so that the second material is optionally harder, tougher and/or less resilient that the first material.

In practical tests, an embodiment, in which the first material is a plastics material and the second material is a metal material, has proved particularly advantageous.

In an embodiment, the second housing part receives the drive motor which is advantageous, in particular, when the second housing part is configured from a metal material. Then the spindle drive may be designed optimally, in particular with regard to the electromagnetic compatibility.

A particularly advantageous variant for connecting the two housing parts of the two-part housing is disclosed herein. In this case, the two housing parts are exclusively connected together via an axial non-positive connection which in an embodiment is provided by a spring arrangement which is otherwise present. Thus it is ensured that the two-part design of the relevant housing does not incur any further costs with regard to the connection.

Some embodiments refer to the provision of at least one of the housing parts of the two-part housing with a sealing arrangement which has at least one seal inside one of the two housing parts. Provided the relevant housing part is designed as a plastics part, at least one part of the sealing arrangement may be easily produced in a two-component plastics injection-molding process.

A method for producing a spindle drive, in particular for producing a sealing arrangement as mentioned above, inside one of the housing parts forms the subject of further teaching.

It is essential according to the further teaching to produce a seal inside the housing and/or housing part in a plastics injection-molding process. It is initially proposed to incorporate at least one opening into the housing and/or housing part and to position an injection mold inside the housing and/or housing part, said injection-mold forming with the internal wall of the housing and/or housing part a cavity corresponding to the at least one opening. Subsequently, a plastics material is injection-molded through the at least one opening in the plastics injection-molding process, so that after a cooling process an appropriate highly flexible seal is formed inside the housing and/or housing part.

Reference may be made to all embodiments of the proposed spindle drive which are suitable for describing the proposed method.

In an embodiment, the invention provides a spindle drive for an adjusting element of a motor vehicle comprising a drive motor with a spindle-spindle nut gear arranged downstream for producing a drive force along a geometric spindle axis, wherein two connectors for transferring the drive force are provided, wherein an internal housing connected to the one connector and an external housing connected to the other connector are provided, and wherein during the motorized adjustment, the internal housing runs in a telescopic manner in the external housing, wherein at least one of the two housings, in particular the internal housing is designed to be at least in two parts and accordingly is provided via a first axial housing portion of a first housing part made of a first material and via a second axial housing portion of a second housing part made of a second material, and in that the arrangement is such that the first axial housing portion is always located outside the flux of force for the drive force.

In an embodiment, the second material is harder than the first material and/or that the second material is less resilient than the first material and/or the second material has a greater degree of toughness than the first material.

In an embodiment, the first material is a plastics material and the second material is a metal material, such as a steel material.

In an embodiment, the second housing part receives the drive motor and optionally an intermediate gear arranged downstream of the drive motor and/or in that one of the two connectors for transferring the drive force is arranged on the second housing part.

In an embodiment, the internal housing is designed as an internal tube and the external housing is designed as an external tube and in that during motorized adjustment the internal tube runs in a telescopic manner in the external tube, such that the internal tube and the external tube are of substantially circular design in cross section.

In an embodiment, the first axial housing portion extends over at least half of the axial length of the two-part housing.

In an embodiment, the first housing part and the second housing part of the two-part housing are axially inserted into one another and as a result form an axial overlapping region.

In an embodiment, the two housing parts of the two-part housing are exclusively connected together via an axial non-positive connection, such that the two housing parts have coupling surfaces corresponding thereto.

In an embodiment, a spring arrangement is provided, said spring arrangement pretensioning the internal housing against the external housing in the axial direction and in that the axial non-positive connection required for the connection between the two housing parts of the two-part housing is due to the spring arrangement, such as the spring arrangement has a helical compression spring in which the spindle of the spindle-spindle nut gear runs.

In an embodiment, the coupling surface of one of the housing parts of the two-part housing is designed as an inwardly protruding annular surface.

In an embodiment, a sealing arrangement is provided, said sealing arrangement having at least one, in particular highly flexible, seal inside one of the housing parts of the two-part housing.

In an embodiment, the sealing arrangement serves for sealing the two housing parts of the two-part housing and has an, in particular, highly flexible seal inside and/or at an axial end of one of the housing parts.

In an embodiment, the adjusting element is a tailgate, a rear lid, an engine hood, a side door, a luggage compartment flap, a lifting roof or the like, of a motor vehicle.

In an embodiment, the invention provides a method for producing a spindle drive for an adjusting element of a motor vehicle, wherein the spindle drive in the finished state has a drive motor with a spindle-spindle nut gear arranged downstream for producing a drive force along a geometric spindle axis, two connectors for transferring the drive force and an internal housing connected to the one connector and an external housing connected to the other connector, wherein during motorized adjustment the internal housing runs in a telescopic manner in the external housing, in that a sealing arrangement is provided which has at least one, in particular highly flexible, seal inside a housing and/or a housing part, wherein for producing the at least one highly flexible seal inside the housing and/or housing part at least one opening is incorporated in the housing and/or housing part, in that an injection mold is positioned inside the housing and/or the housing part, said injection mold forming with the internal wall of the housing and/or housing part a cavity corresponding to the at least one opening and in that the highly flexible seal is injection-molded in a plastics injection-molding process through the at least one opening.

BRIEF DESCRIPTION OF THE FIGURES

The invention is described in more detail hereinafter with reference to a drawing showing merely one exemplary embodiment. In the drawing.

DETAILED DESCRIPTION

Figure 1:
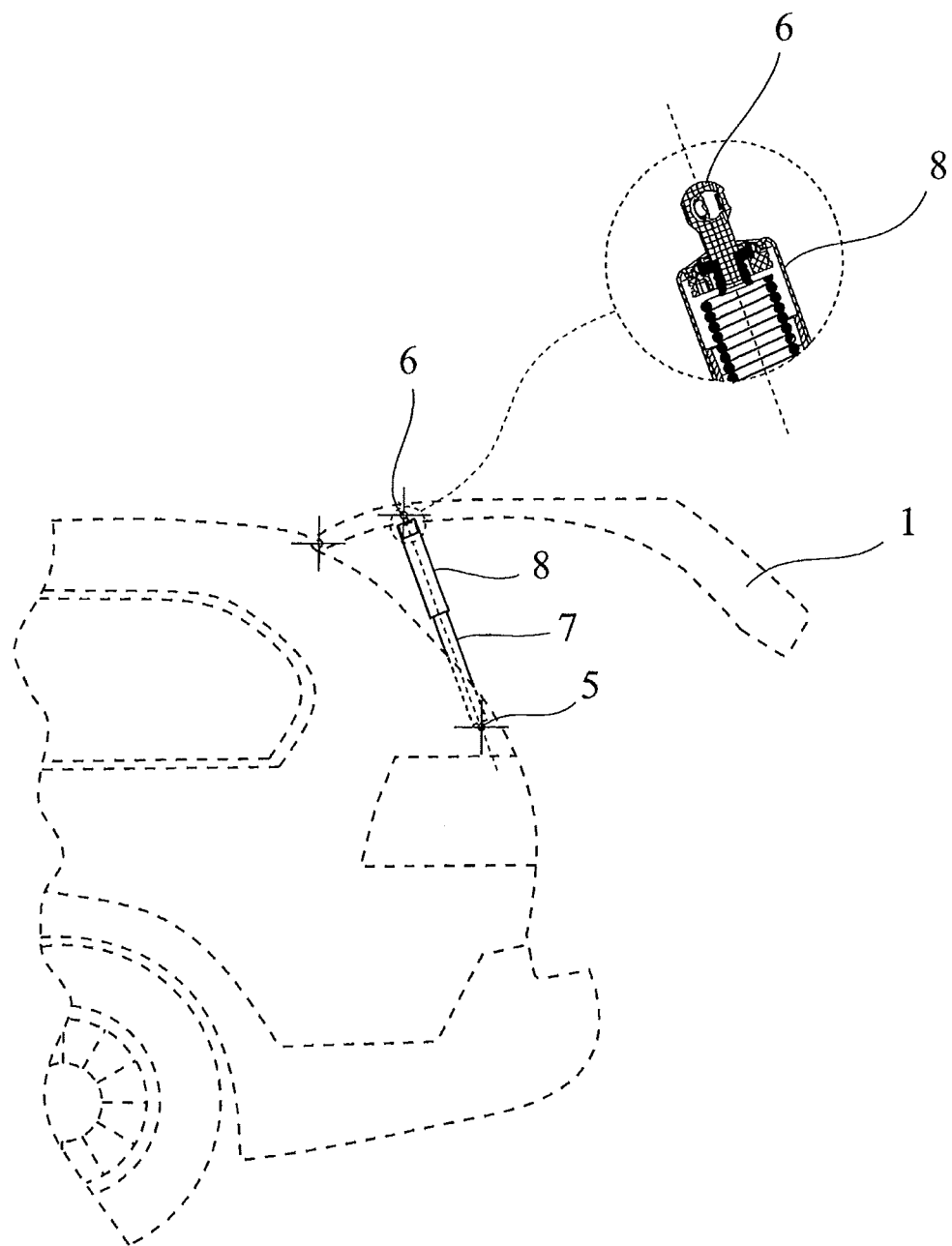
FIG. 1 shows in a schematic side view the rear of a motor vehicle with a proposed spindle drive.

The spindle drive shown in the drawing serves for the motorized adjustment of an adjusting element 1 of a motor vehicle designed as a tailgate. Other fields of application of the proposed spindle drive are conceivable as is described in detail below.

The spindle drive is conventionally provided with a drive motor 2 with a spindle-spindle nut gear 3 arranged downstream for producing a drive force along a geometric spindle axis 4. In this case, an intermediate gear 2a which serves for speed reduction is located between the drive motor 1 and the spindle-spindle nut gear 3.

The spindle drive has two connectors 5, 6 for transferring the drive force. The connectors 5, 6 in this case provides ball-ball socket couplings.

Figure 2:
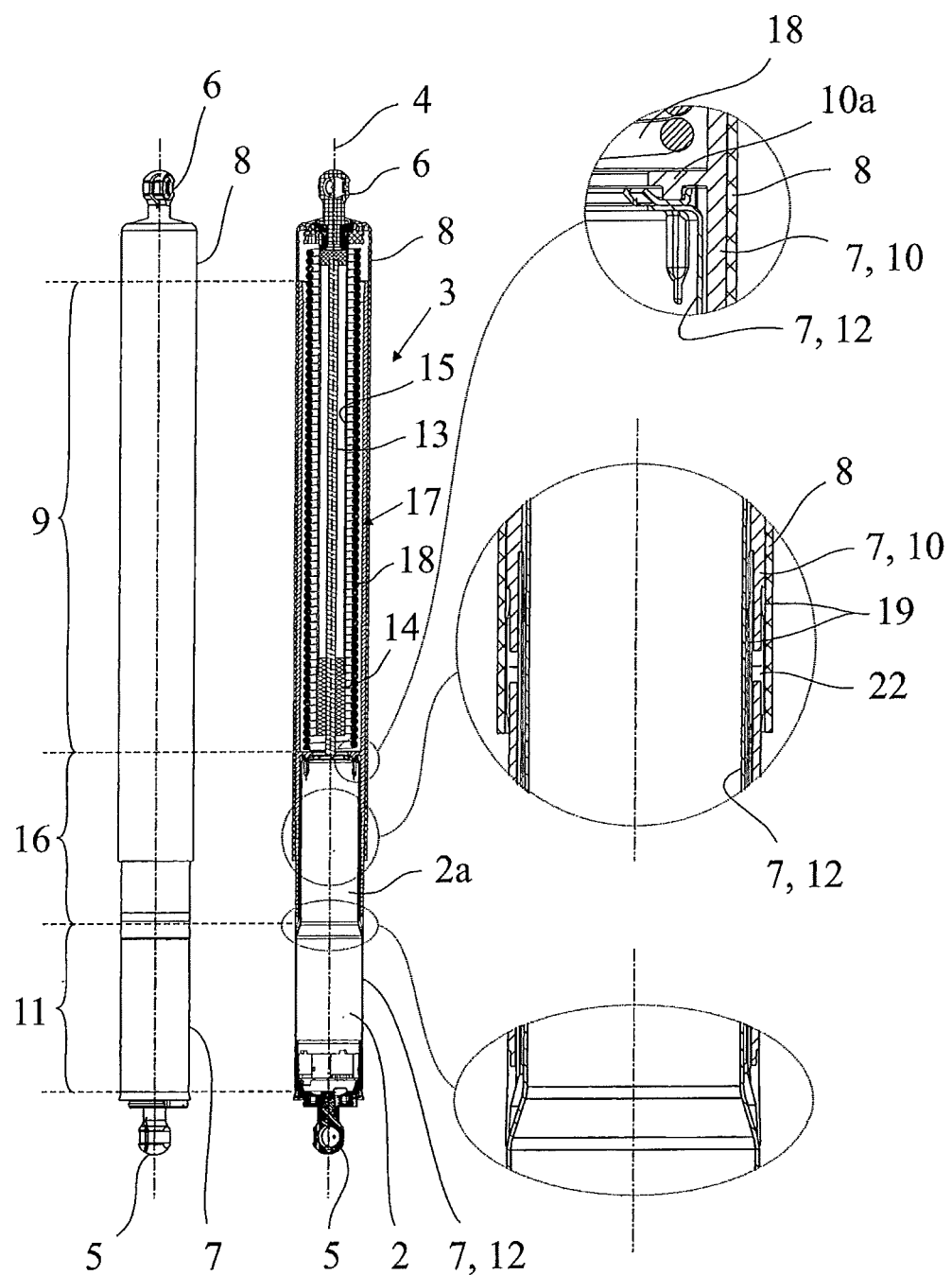
FIG. 2 shows the spindle drive as claimed in FIG. 1 in an external view (left) and a sectional view (right) in each case from the side and FIG. 3 shows the internal housing of the spindle drive as claimed in FIG. 1 in an exploded view.

FIG. 2 shows that an internal housing 7 connected to the one connector 5 and an external housing 8 connected to the other connector 6 are provided, wherein during motorized adjustment the internal housing 7 runs in a telescopic manner in the external housing 8.

Figure 3:
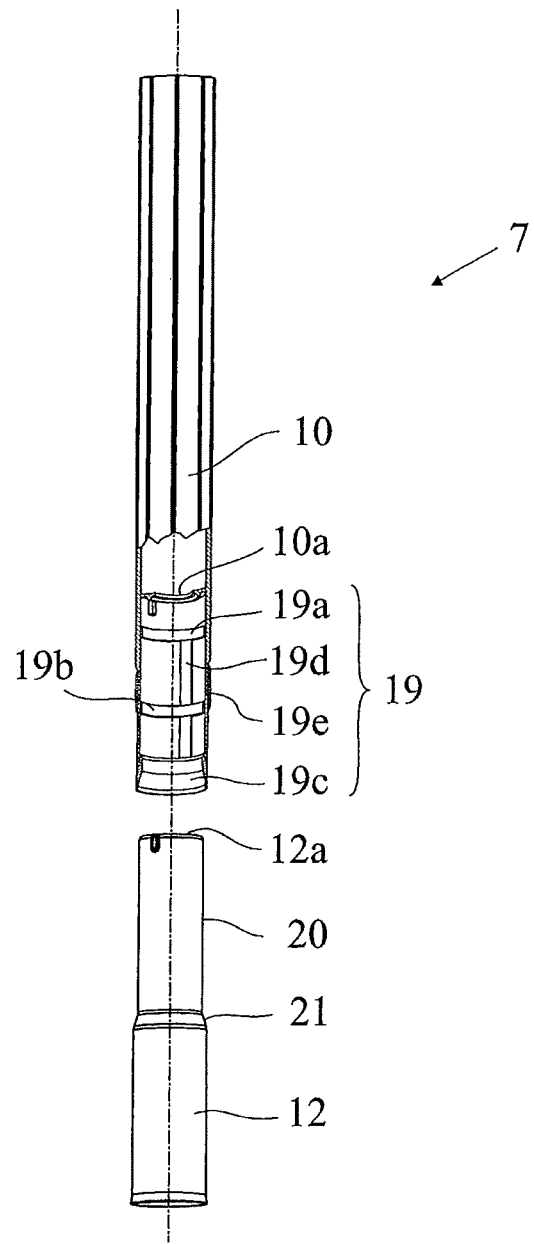

It is thus significant that at least one of the two housings 7, 8, in particular the internal housing 7, is designed at least in two-parts. This may be derived most clearly from viewing FIGS. 2 and 3 together. The wall of the internal housing 7 is accordingly provided via a first axial housing portion 9 of a first housing part 10 made of a first material and via a second axial housing portion 11 of a second housing part 12 made of a second material. FIG. 3 shows in the exploded view the two housing parts 10, 12 which accordingly consist of different materials.

According to the proposed solution, the arrangement is such that the first axial housing portion 9 is always located outside the flux of force for the drive force. As a result, a covering and/or sealing may be assigned to the first housing part 10 of the internal housing 7, for example. This is clear from the present descriptions for producing the drive force.

The design of the internal housing 7, such as of the two housing parts 10, 12 of the internal housing 7, will be primarily discussed hereinafter. All embodiments relating to the internal housing 7, however, accordingly apply to the external housing 8.

The drive motor 2 and the intermediate gear 2a are received by the second housing part 12 which is connected to the first housing part 10 in a manner yet to be explained. The spindle 13 of the spindle-spindle nut gear 3 emerges from the intermediate gear 2a, said spindle meshing with a spindle nut 14. The spindle nut 14 is connected by a tube 15, which is denoted here as the guide tube 15, to the upper connector 6 of the spindle drive. The upper connector 6 is in turn, as outlined above, connected to the external housing 8.

During motorized adjustment, the flux of force for the drive force passes via the connector 5, the second housing part 12 of the internal housing 7, the second axial housing portion 11 at that point, the drive motor 2 and the intermediate gear 2a, the spindle 13, the spindle nut, the guide tube 15 and the upper connector 6. It is significant here that no flux of force passes via the first housing part 10, in particular the first axial housing portion 9, of the internal housing 7.

Accordingly, the first housing part 10 may be designed to be weaker than the second housing part 12. The second material can be harder than the first material and/or the second material has a greater degree of toughness than the first material and/or the second material is less resilient than the first material. In summary, the proposed solution permits a design of the internal housing 7 and the external housing 8 which is tailored to the actual force ratios.

In an embodiment, the first material from which the first axial housing portion 9 is configured is a plastics material and the second material from which the second axial housing portion 11 is configured is a metal material, in particular a steel material. The configuration of the second axial housing portion 11 from a metal material results in good electromagnetic compatibility which is advantageous, provided the drive motor 2 is arranged in the second axial housing portion 11, i.e. in the second housing part 12, as shown in the drawings.

FIG. 2 shows that the lower connector 5 is arranged on the second housing part 12 for transferring the drive force. In this case, to a certain extent the connector 5 forms a cover for the internal housing 7. This cover may be crimped, bonded, screwed or the like to the internal housing 7.

The drawing shows that, in this case, the internal housing 7 is designed as an internal tube and the external housing 8 is designed as an external tube, wherein during motorized adjustment the internal tube 7 runs in a telescopic manner in the external tube 8. Different variants are conceivable for the cross section of the internal tube 7 and external tube 8. In an embodiment, the internal tube 7 and the external tube 8 are of substantially circular design in cross section. FIG. 2 shows that the first axial housing portion 9 extends over more than half the overall axial length of the two-part internal housing 7. In this case, it is particularly clear that by means of the proposed solution a large proportion of the internal housing 7 consists of plastics material whilst the smaller but force-transmitting part is configured from a metal material.

The design of the internal tube 7 shown is particularly advantageous with regard to its basic mechanical structure. This relates, in particular, to the mechanical connection of the two housing parts 10, 12.

Viewing FIGS. 2 and 3 together shows that the first housing part 10 and the second housing part 12 of the two-part internal housing 7 are inserted into one another in an axial manner and as a result form an axial overlapping region 16. In this case, the second housing part 12 is inserted into the first housing part 10.

It is particularly significant regarding the connection of the two housing parts 10, 12 of the internal housing 7 that the two housing parts 10, 12 are exclusively connected together via an axial non-positive connection. The term "connected" in this case is to be understood here in the narrow sense, such that the two housing parts 10, 12 are not able to be released from one another by external forces. This means that by removing the axial non-positive connection, the two housing parts 10, 12 may be released from one another. For the axial non-positive connection, the two housing parts 10, 12 are provided with corresponding coupling surfaces 10a, 12a.

The production of the axial non-positive connection required for the connection of the two housing parts 10, 12 is achieved in an extremely simple manner in the embodiment shown. It is proposed that a spring arrangement 17 which pretensions the internal housing 7 against the external housing 8 in the axial direction is provided. This axial pretensioning can result in the two connectors 5, 6 being forced apart. The spring arrangement 17 is shown by way of example in FIG. 2 and occur in a range of known spindle drives. Such a spring arrangement 17 is generally used in order to assist the drive motor 2 against the weight of the tailgate 1 or the like during motorized adjustment.

It is thus essential that the axial non-positive connection required for the connection between the two housing parts 10, 12 of the two-part internal housing 7 is due to the spring arrangement 17. In the exemplary embodiment shown, the spring arrangement 17 has a helical compression spring 18 in which the spindle 13 of the spindle-spindle nut gear 3 runs. The helical compression spring 18 presses onto the coupling surface 12a on the second housing part 12, on the one hand, via the coupling surface 10a on the first housing part 10, and onto the upper connector 6 and/or the external housing 8, on the other hand. Via the guide tube 15, a corresponding force is exerted on the spindle nut 14 so that the spindle nut 14 is driven upwards in FIG. 2.

The helical compression spring 18 is thus designed so that even when the spindle drive is completely extended, a considerable pretensioning force acts. The pretensioning force, as explained above, results in a compression of the two coupling surfaces 10a, 12a and thus in the non-positive connection of the two housing parts 10, 12.

For the design of the coupling surfaces 10a, 12a a series of advantageous variants are conceivable. In this case, the coupling surface 10a of the first housing part 10 of the internal housing 7 is an inwardly protruding annular surface. The annular surface 10a forms an annular collar which, relative to the geometric spindle axis 4, is arranged so as to circulate around the internal wall of the first housing part 10.

In this case, the internal housing 7 is provided with a sealing arrangement 19 which has a whole series of seals 19a-d. In this case, the seals 19a-d serve for sealing the first housing part 10 relative to the second housing part 12 whilst the seal 19e serves for sealing the internal housing 7 relative to the external housing 8. The seals 19a-c bear against the external wall 20 of the second housing part 12, whilst the seal 19c additionally bears against the cone 21 formed by the second housing part 12. Accordingly, the seal 19c is arranged on an axial end of the first housing part 10 of the internal housing 7.

FIG. 3 shows that the seals 19a-c are of substantially annular design. In this case, an axially offset arrangement has proved particularly advantageous. The seal 19d extends substantially axially which is advantageous not only in terms of sealing technology but also acts so as to prevent vibration.

The production of the seals 19a-d which are located inside the internal housing 7, in this case inside the first housing part 10 of the internal housing 7, is the subject of further teaching which has independent meaning.

In the proposed method, for producing the at least one highly flexible seal 19a-d inside the internal housing 7 and/or housing part 10 at least one opening 22 is incorporated in the internal housing 7 and/or the housing part 10. Subsequently, an injection-mold, not shown, is positioned inside the internal housing 7 and/or housing part 10, said injection-mold forming with the internal wall of the internal housing 7 and/or housing part 10a cavity corresponding to the at least one opening 22. Finally, the highly flexible seal is injection-molded in a plastics injection-molding process through the at least one opening 22.

The proposed method permits the production of the sealing arrangement 19 using simple injection-molding tools, in this case the internal injection mold. Moreover, it is possible subsequently to injection-mold an external seal 19e which covers the openings 22.

With regard to the proposed method, the practical embodiment of the sealing arrangement 19 shown in FIG. 3 has a particular advantage, namely the possibility of injection-molding all three annular seals 19a-c using a single axial injection-molding point. This is possible as all three annular seals 19a-c are connected through the axially extending seal 19d. Thus all internal seals 19a-d may be advantageously produced in a single injection-molding process.

The proposed spindle drive is able to be used for all manner of adjusting elements 1 of a motor vehicle. For example, in this case the aforementioned tailgate, a trunk lid, an engine hood, a side door, a luggage compartment flap, a lifting roof or the like, of a motor vehicle might be cited here.

The invention claimed is:

1. A spindle drive for an adjusting element of a motor vehicle comprising a drive motor with a spindle-spindle nut gear arranged downstream for producing a drive force along a geometric spindle axis, wherein two connectors for transferring the drive force are provided, wherein an internal housing connected to one of the two connectors and an external housing connected to the other of the two connectors are provided, and wherein during the motorized adjustment, the internal housing runs in a telescopic manner in the external housing,
wherein at least one of the internal housing and the external housing is designed to be at least in two parts and accordingly is provided via a first axial housing portion of a first housing part made of a first material and via a second axial housing portion of a second housing part made of a second material, with the first housing part being connected to the second housing part,
wherein the arrangement is such that the first axial housing portion is always located outside the flux of force for the drive force,
wherein the drive motor is disposed within the second axial housing portion,
wherein the second axial housing portion is connected to one of the two connectors, and
wherein at least a portion of the second axial housing portion is external to the first axial housing portion.

2. The spindle drive as claimed in claim 1, wherein the second material is harder than the first material and/or that the second material is less resilient than the first material and/or the second material has a greater degree of toughness than the first material.

3. The spindle drive as claimed in claim 1, wherein the first material is a plastics material and the second material is a metal material.

4. The spindle drive as claimed in claim 3, wherein the metal material comprises a steel material.

5. The spindle drive as claimed in claim 1, wherein the second housing part receives an intermediate gear arranged downstream of the drive motor or wherein one of the two connectors for transferring the drive force is arranged on the second housing part.

6. The spindle drive as claimed in claim 1, wherein the internal housing is designed as an internal tube and the external housing is designed as an external tube and in that during motorized adjustment the internal tube runs in a telescopic manner in the external tube.

7. The spindle drive as claimed in claim 6, wherein the internal tube and the external tube are of substantially circular design in cross section.

8. The spindle drive as claimed in claim 1, wherein the first axial housing portion extends over at least half of the axial length of the two-part housing.

9. The spindle drive as claimed in claim 1, wherein the first housing part and the second housing part of the two-part housing are axially inserted into one another and as a result form an axial overlapping region.

10. The spindle drive as claimed in claim 1, wherein the two housing parts of the two-part housing are exclusively connected together via an axial non-positive connection.

11. The spindle drive as claimed in claim 10, wherein a spring arrangement is provided, said spring arrangement pretensioning the internal housing against the external housing in the axial direction.

12. The spindle drive as claimed in claim 11, wherein the spring arrangement has a helical compression spring in which the spindle of the spindle-spindle nut gear runs.

13. The spindle drive as claimed in claim 1, wherein a coupling surface of one of the housing parts of the two-part housing is designed as an inwardly protruding annular surface.

14. The spindle drive as claimed in claim 1, wherein a sealing arrangement is provided, said sealing arrangement having at least one seal inside one of the housing parts of the two-part housing.

15. The spindle drive as claimed in claim 14, wherein the sealing arrangement serves for sealing the two housing parts of the two-part housing and has a seal inside and/or at an axial end of one of the housing parts.

16. The spindle drive as claimed in claim 15, wherein the seal comprises a flexible seal.

17. The spindle drive as claimed in claim 14, wherein the at least one seal comprises a flexible seal.

18. The spindle drive as claimed in claim 1, wherein the adjusting element is a tailgate, a rear lid, an engine hood, a side door, a luggage compartment flap, or a lifting roof, of a motor vehicle.

* * * * *